April 7, 1931.  C. DOERING ET AL  1,799,504
CONTINUOUS BUTTER WORKING MACHINE
Filed Dec. 9, 1927  4 Sheets-Sheet 3
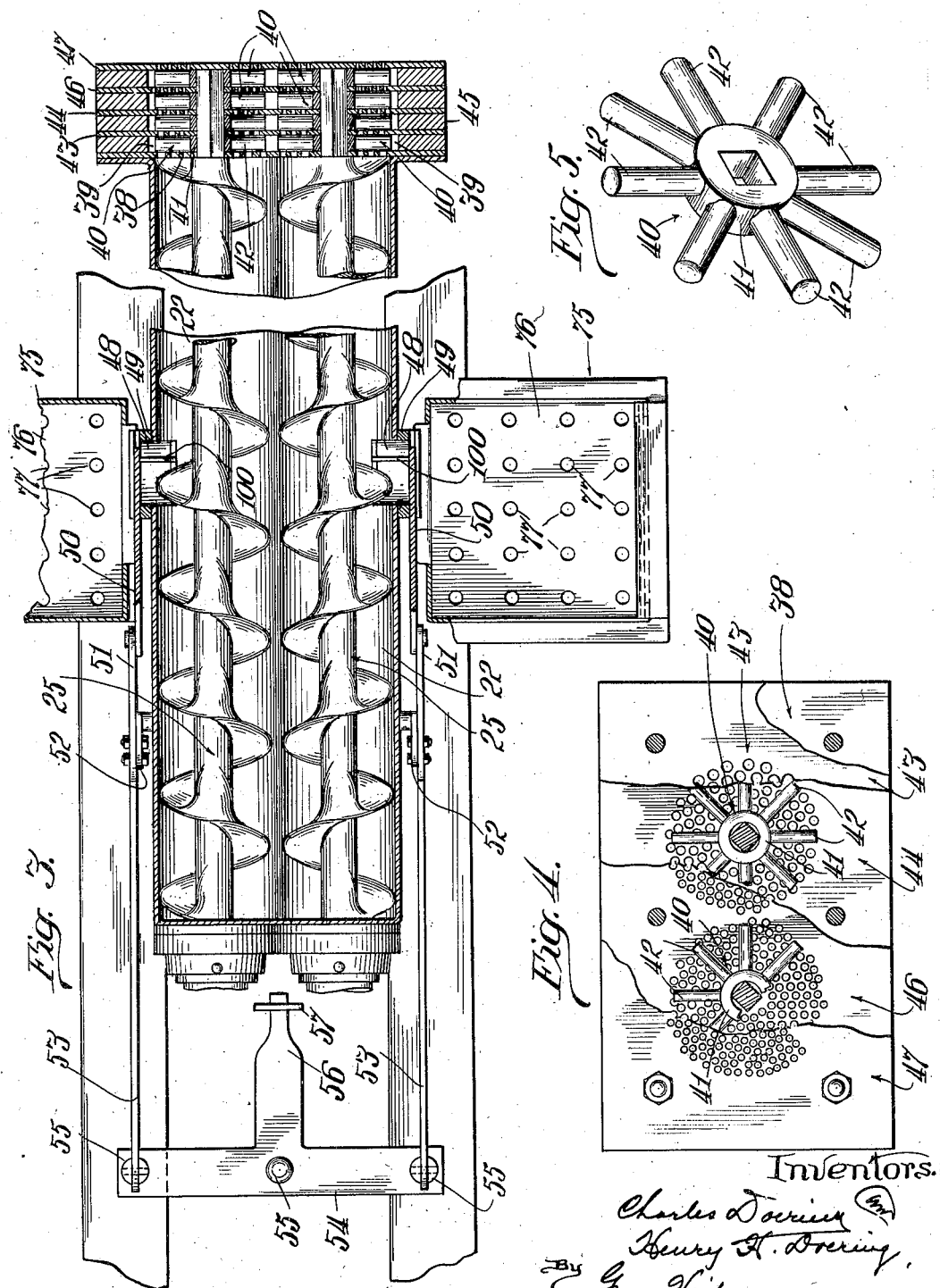

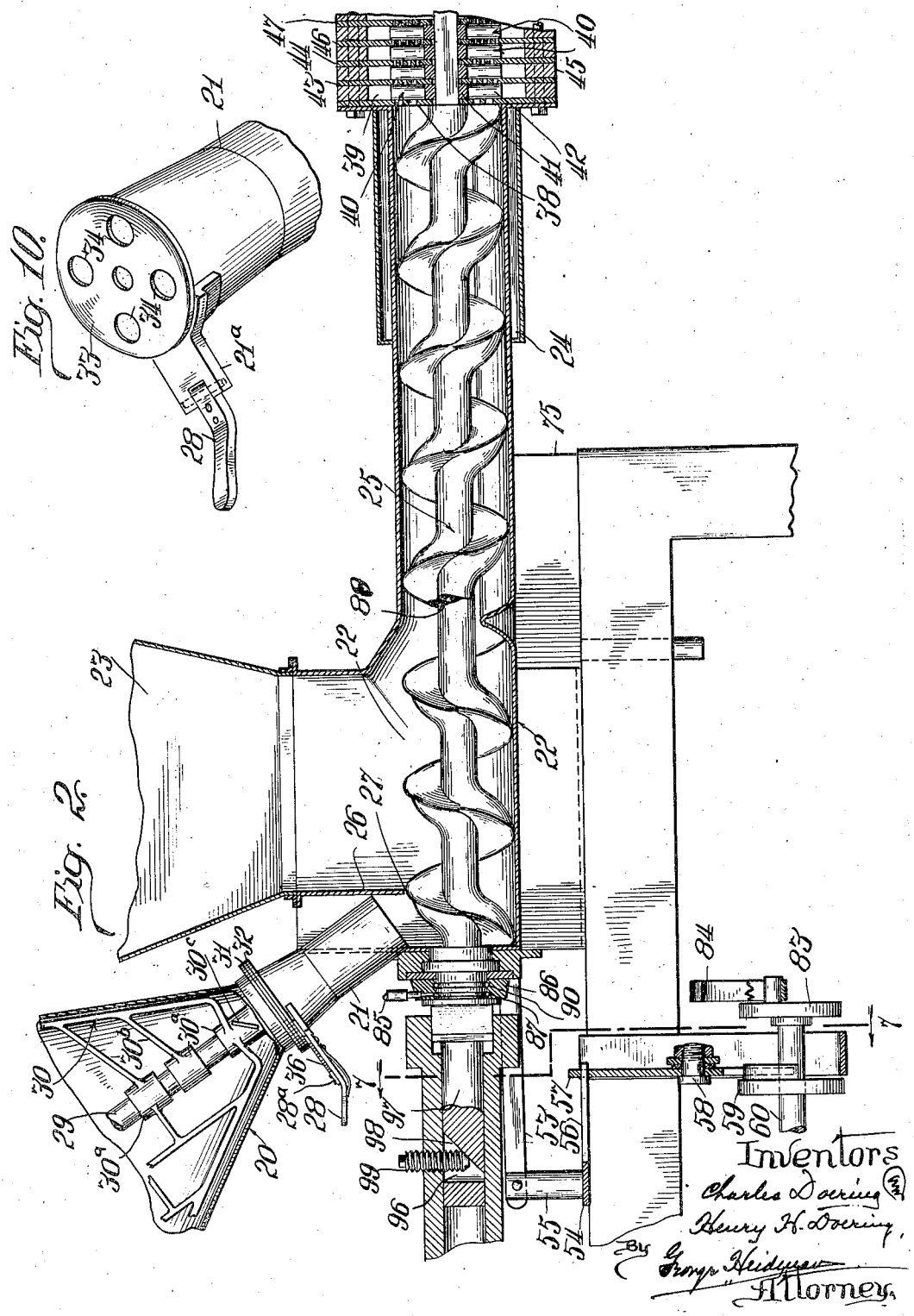

April 7, 1931. C. DOERING ET AL 1,799,504
CONTINUOUS BUTTER WORKING MACHINE
Filed Dec. 9, 1927    4 Sheets-Sheet 4
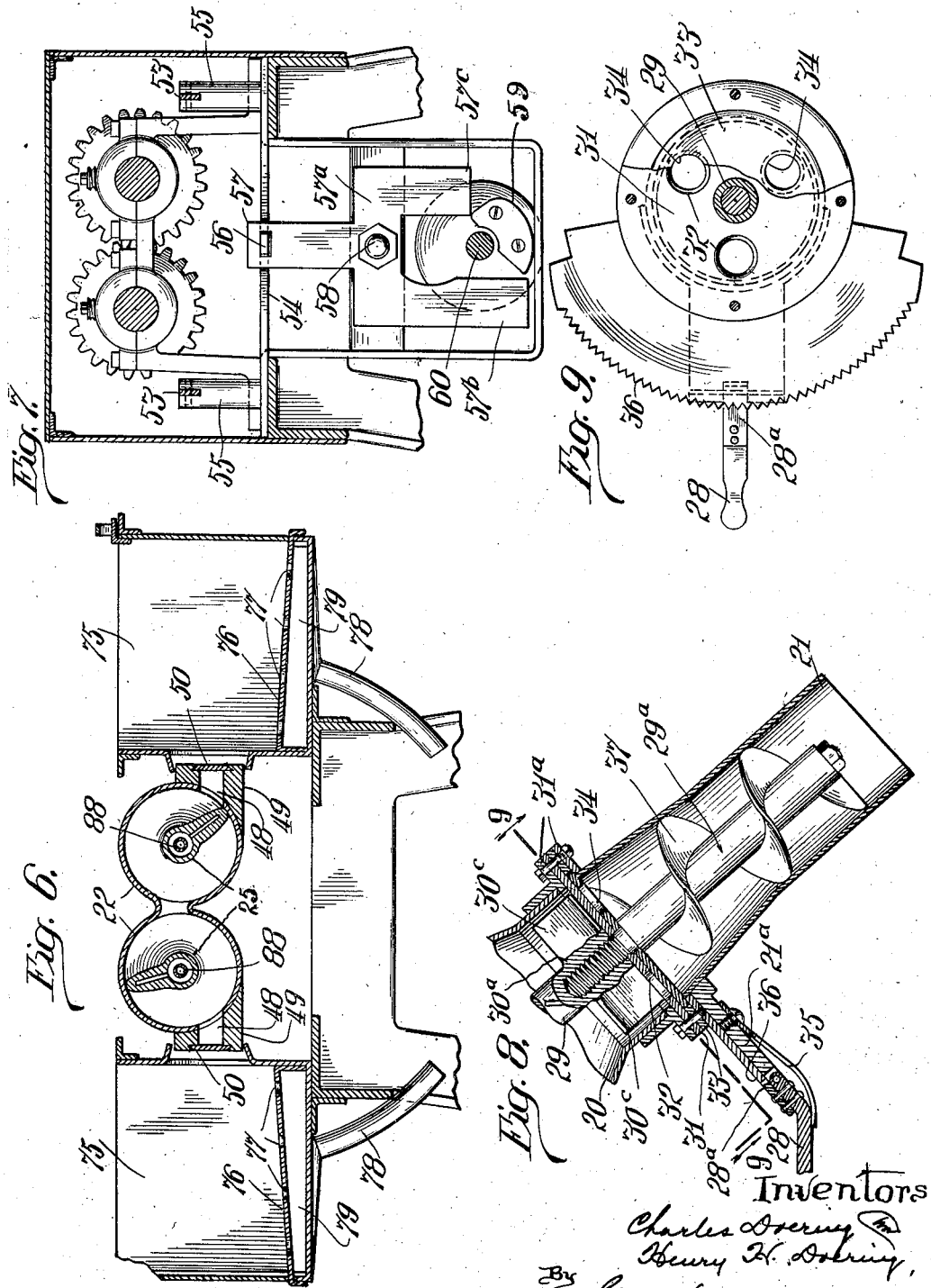

Patented Apr. 7, 1931

1,799,504

UNITED STATES PATENT OFFICE

CHARLES DOERING AND HENRY H. DOERING, OF CHICAGO, ILLINOIS

CONTINUOUS BUTTER-WORKING MACHINE

Application filed December 9, 1927. Serial No. 238,733.

Our invention relates to a machine for continuously working butter, and more especially butterine; the invention having for its object the provision of a machine whereby a more thorough and uniform mixing and intermingling of the various crystals or fat globules as well as of the ingredients or salt is produced and as a result a butter or butterine of finer texture provided; while at the same time permitting a more sanitary manipulation or operation.

The invention involves means whereby the temperature and degree of fineness of the butter feeding and working elements may be controlled and regulated in keeping with the condition of the product passing through the machine.

The invention also involves automatically controlled means for withdrawing excess moisture; as well as means for inducing a positive feed, in predetermined or regulable quantities, of the ingredients or salt.

The objects recited, as well as others, and the advantages of our invention will be readily comprehended from the detailed description of the drawings, wherein:—

Figure 2 is a longitudinal sectional view with portions of the hopper, the salt holding receptacle and driving mechanism broken away.

Figure 3 is a sectional elevation of the compression chamber or conveyor portion of the machine.

Figure 4 is a detail elevation of the compression means and agitators or workers, with parts broken away, at the delivery end of the compression chamber shown in Figure 3.

Figure 5 is a detail perspective view of one of the worker elements arranged at the delivery end as shown in Figures 3 and 4.

Figure 6 is a vertical sectional view taken on the line 6—6 of Figure 1 looking in the direction of the arrows.

Figure 7 is a sectional view taken on the line 7—7 of Figure 2 looking in the direction of the arrows.

Figure 8 is a longitudinal sectional view of the lower part of the ingredient introducing mechanism.

Figure 9 is a sectional plan view taken on the line 9—9 of Figure 8 looking in the direction of the arrows.

Figure 10 is a detail view, in perspective, of the regulable outlet of the ingredient or salt receptacle.

Figure 1:
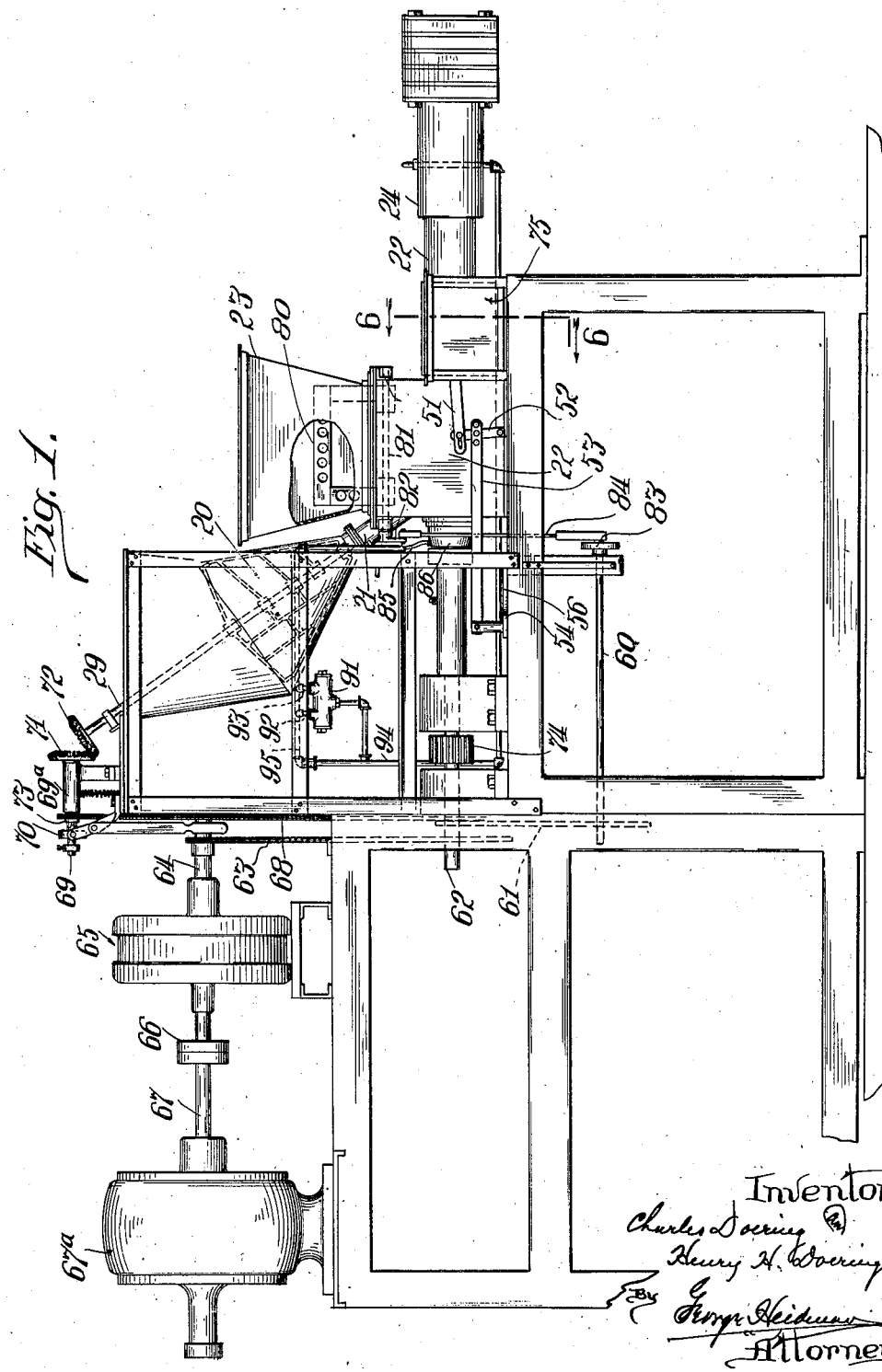
Figure 1 is a side elevation of our improved machine, with a portion of the supporting standard and of the receiving hopper broken away.

In the particular exemplification, 20 represents a suitable hopper or receptacle for receiving salt, or other suitable ingredients, intended to be fed or introduced into the butter or butterine. The hopper or feeder 20 is preferably somewhat cone-shaped and arranged at the inclination shown, with its delivery end terminating in a tube 21 extending into the butter or butter-crystal receiving trough 22. The trough 22 is provided at one end with a feed hopper 23 through which the fat or butter crystals are introduced. A portion of the trough is preferably water-jacketed as shown at 24. The trough is of double type, namely formed so as to provide two parallel elongated channels or chambers, each of which is provided with a water heated worm-screw or conveyor 25, see Figures 2, 3 and 6. The combined crystal receiving end of the chambers 22 is provided with a partition 26 through which the worm screws 25 extend; the partition 26 having suitable openings 27 about the screws to permit passage of the ingredients or salt discharged from the tube or nozzle 21 of the ingredient holding receptacle 20. The function of the partition 26 is to prevent the rearward movement of the butter crystals toward and crowding up into the delivery spout 21 of the ingredient introducing vessel 20; the partition also causes the ingredients to be more completely mixed with the fat or butter crystals and to permit a more uniform and accurate mixing of the ingredients with the butter fat crystals.

The introduction of the ingredients or salt into chambers 22 is controlled by a suitable valve which is actuated by operation of the handle 28. The valve mechanism controlled by the handle 28 permits the desired percentage or quantity of ingredient to be introduced. This mechanism comprises a shaft 29 which is rotatably mounted in and extends from the top down into the discharge tube 21. This shaft 29 has an agitator which consists of a skeleton frame 30, portions whereof extend into close proximity to and parallel with the wall of the receptacle 20; said frame being connected to the hub portions 30ª by means of the radial ribs or spokes 30ᵇ. The lower hub 30ª is provided with inclining blades 30ᶜ which may be arranged in pairs in different horizontal planes if desired, with at least one pair arranged in close relation with a plate 31 which is stationarily secured to the hopper or receptacle 20. This plate 31 is provided with holes 32. Mounted immediately beneath plate 31 is a second plate 33 having perforations 34; plate 33 is secured to and forms the top of the discharge tube 21 to which the handle 28 is secured, as clearly shown in Figure 10. By oscillating handle 28, tube 21 with plate 33 is rotated so as to have the openings 34 thereof either partially or entirely brought into register with the openings 32 in the upper stationary plate 31. The plate 33 extends slightly beyond the perimeter of the tube 21 and is rotatably held in place by the composite flanged collar 31ª which is secured to the lower end of the receptacle 20. The handle 28 is pivoted at 28ª to the arm 21ª stationarily secured to the tube 21 and the handle is provided with a toothed plate 28ª (see Figure 9). The handle 28 is held upward in normal position by a spring plate 35. When the handle 28 is held in normal position, its toothed plate 28ª is held in mesh with the teeth of sector plate 36 which is stationarily secured to the receptacle 20 by the composite collar. With the toothed plate 28ª in mesh with the teeth of the plate 36, the handle 28 and therefore also plate 33 are held against accidental movement or rotation.

The lower shaft section 29ª in the tube 21 is preferably shown removably secured to shaft 29; and this section 29ª is provided with a worm-screw or conveyor 37 for the purpose of causing a positive feeding of the ingredients from the receptacle or hopper 20. Worm 37 extends into close proximity to worms 25 and therefore cause the ingredients or salt to be positively fed down to the conveyors 25 whereby it is forced into positive contact with the butter crystals.

As the mass passes along the chambers 22 by the action of the conveyors it is forced through a perforated plate 38 at the delivery ends of chambers 22. Plate 38 is provided with comparatively large sized holes. The butter or butter crystals with the introduced ingredients are forced into a small space or chamber 39 in which are located revolving workers 40 which consist of a hub portion 41 provided with a plurality of radially disposed arms or spokes 42 which are preferably cylindrical in form (see Figure 5). A worker 40 is secured to the squared spindle 42 of each worm or conveyor 25 so as to rotate therewith, as shown in Figure 3. Secured immediately beyond the first workers 40 is a second plate 43 also provided with perforations, but of a somewhat smaller size than the perforations in plate 38; and this plate in turn is spaced from a succeeding plate 44 by the partition wall or spacers 45 so as to provide a chamber between the plates 43 and 44 to receive workers 40 similar to that shown in Figure 5. In the particular exemplification of the machine as illustrated in the drawings, the delivery ends of the chambers 22 are shown provided with a plurality of perforated plates, as for example five in number; it being understood that any suitable number may be employed in keeping with the material to be operated on and the amount of moisture to be retained in the finished product. With our improved machine the amount of moisture in the finished product can be regulated by either removing or adding additional plates depending upon the quality of goods operated on. The plates are all spaced apart as shown in Figures 2 and 3 and each plate perforated with perforations of a size differing from the size of perforations in the other plates with the plates arranged either in the order shown in Figure 2 where the perforations of plate 38 are larger than the perforations of plate 43 and the perforations of plate 43 larger than plate 44, while the perforations of plate 44 are larger than the perforations of plate 46 and the perforations of plate 46 larger than the perforations of plate 47. The respective plates are all spaced apart as previously described to permit workers 40 to be placed therebetween; it being understood that the spindles 42 of the conveyors 25 extend through suitable openings in each of the plates.

As the crystals or vermicular mass comes through the plates, the workers mix the crystals and force the water out of the crystals or fat globules and force them more or less into a solid or compact mass while the expressed water is allowed to flow back into the chambers 22.

The outer wall of each chamber 22 is provided with an opening as shown at 48 in Figure 3 surrounded by a casing 49 which contains a slide 50 for opening and closing opening 48. The opening and closing of the slides 50, on opposite sides of the machine, is automatically controlled. Each slide or plate 50 is provided with an arm 51 pivotally connected to a link 52 (see Figure 1) pivoted to the side of the machine. Each link 52 in turn has a rod 53 pivotally connected therewith, the opposite ends whereof are pivoted to a connecting bar 54 which in turn is pivoted at 55 on the frame of the machine. The pivot point 55 at its bottom is provided with an arm 56 which is controlled by an arm 57 pivoted at 58. The lower end of the arm 57 is provided with a transversely disposed portion 57$^a$ having at opposite ends depending arms 57$^b$ and 57$^c$ (see Figure 7). These depending arms 57$^b$ and 57$^c$ are alternately engaged by an eccentric 59 secured to a shaft 60.

The shaft 60 is driven by means of a sprocket chain 61 which is driven by a sprocket on shaft 62 which latter in turn is driven by a chain 63 from power shaft 64 of a spur gear reducer 65 which is coupled at 66 to the motor shaft 67 of electric motor 67$^a$.

Shaft 62 directly drives one of the worms or conveyors 25. Shaft 62 also drives a sprocket chain 68 which operates shaft 69 journaled in a suitable bracket 69$^a$; shaft 69 being provided with a clutch 70 and with a bevel gear 71 which meshes with bevel gear 72 on shaft 29 of the ingredient or salt introducing mechanism. The clutch 70 is adapted to produce operative relation between shaft 69 and sprocket 73, thus enabling shaft 69 to be placed into and out of operative relation with the shaft 62. Shaft 62 is also provided with a gear 74 which meshes with a similar gear on a short shaft arranged in operative relation with the other conveyor 25 so that both conveyors 25 will rotate in unison but in opposite directions namely toward each other.

The water flows backward through the chambers 22 to the openings 48; and when the slide plates 50 are alternately moved into open position, the water is permitted to flow into the receptacles 75; one being arranged on each side of the machine. As the water flowing back may carry with it a small amount of butter crystals or fat globules, we provide the receptacles 75 in order to prevent loss of these crystals. These receptacles 75 are of any suitable configuration and size and are provided with a false bottom 76 provided with perforations 77 as shown in Figures 3 and 6; the perforations 77 being comparatively small so as to prevent passage of the butter crystals therethrough, as the tendency of the butter crystals or fat globules is to adhere to each other in an agglomerate mass which will prevent their passage through the perforations 77. The outer bottoms of the receptacles 75 are each provided with an outlet tube 78 directed toward a suitable receptacle (not shown) for draining the water from the bottom space 79 in the receptacle 75.

With the plate or arm 57$^a$ bifurcated as previously described (see Figure 7), it is apparent that when eccentric 59 engages bifurcation 57$^b$, arm 57 will be oscillated about pivot point 58 in one direction and when eccentric 59 engages bifurcation 57$^c$ the arm 57 will be oscillated in the opposite direction, thus causing arm 54 to oscillate about pivotal point 55 and as a result alternately move the plates 50 into open and closed positions; that is to say plate 50 on one side of the machine will be moved to open position while the plate 50 on the opposite side will be moved to closed position.

The hopper 23 is provided with a butter feeder or presser element shown in the form of a frame 80, see Figure 1, secured to a shaft 81, whose one end is provided with a crank-arm 82 which is connected to a crank-pin or disc 83 by means of link or rod 84; disc 83 being secured to shaft 60. Rod 84 is provided at bottom with a slot to receive the pin of disc 83, thus causing shaft 81 to rock and thereby oscillate feeder frame 80, which is shown preferably provided with perforations (see Figure 1) to reduce resistance.

The conveyors 25 are preferably provided with ducts or channels to permit circulation of hot water through the conveyors 25; the water being introduced by pipe 85 into a collar 86 fitted about the spindles of the conveyors. The collar 86 is provided with an annular groove 87 to receive the heated water and this groove in turn communicates with ports in the conveyor-spindles, allowing the water to flow lengthwise through the tube 88 (which is smaller than the chambers in the worm-screws) and to return through the chamber in the conveyor and be discharged into annular grove 90 in collar 86, from whence it may be taken by a suitable conduit (not shown), connected to an outlet port in the collar.

In order that the water temperature may be regulated and determined, we provide an automatic or thermostatically controlled water mixer at 91, provided with cold and hot water inlet pipes at 92 and 93, respectively. The water mixer 91 is provided with a tempered water outlet 94 which leads to the water jacket 24 at the worker end of the machine; and with a tempered water line 95 which connects with the pipe 85 of each conveyor 25.

In order to compensate for any wear and to maintain proper close contact between the delivery ends of the conveyors 25 and the perforated plate 38, we show the end of shafts which drive the conveyor screws 25 each provided with a longitudinal socket 96 in which a plunger or pin 97 is slidable. The pin 97 abuts against the end of its respective screw-conveyor, while the other end of the pin 97 is beveled as shown at 98, and is engaged by set-screw or bolt 99. It is apparent that when set-screw 99 is screwed downwardly, it will force pin 97 forward and hence cause the respective screw-conveyor 25 to move likewise into closer relation with the first perforated plate 38.

As the openings 48 may be somewhat closed by the mass passing through the chambers 22 and thus prevent proper withdrawal or outflow of the excess moisture, we show the slide plates 50 each provided with an inwardly disposed wing or extension 100; the inner end whereof is dished or made arcuate to somewhat conform to the circumference of the worm-screws to permit such wings to be extended into close proximity to the worms. These wings 100 are secured to the plates 50 at a slight distance removed from one of the vertical edges of said plates to permit complete closing position of the plates to be attained. It is apparent that when the plates 50 move to open position, the wings 100 will cause the butter mass to be moved away from the openings 48 and allow free flow of the excess moisture into the receptacles 75.

We have shown what is believed to be the best embodiment of our invention which we have described in terms employed merely as terms of description and not as terms of limitation, as structural modifications may be made without departing from the spirit of our invention.

What we claim is:—

1. In a continuous butter working machine, the combination of a closed trough provided with a pair of worm screws rotatably mounted therein, one end of the trough being provided with a butter introducing hopper and with an ingredient introducing hopper arranged to discharge into the trough rearward of the butter introducing hopper, a partition in the trough intermediate of the butter introducing hopper and the discharge end of the ingredient introducing hopper, said partition being disposed about the worm screws, a continuously rotating stirrer mounted in said last mentioned hopper, and regulable means at the discharge end of said last mentioned hopper for controlling the quantity of ingredients discharged therefrom.

2. In a continuous butter working machine, the combination of a closed trough having a butter introducing opening at one end, with an ingredient holding receptacle having a discharge tube adapted to discharge into said opening in the trough, a skeleton frame rotatably mounted in said receptacle, a partition in the trough intermediate of the butter introducing opening and the discharge of the receptacle, and means at the upper end of said tube for controlling the outlet opening therethrough.

3. In a continuous butter working machine, an ingredient container provided with a discharge spout, a skeleton stirrer rotatably mounted in said container, a pair of perforated plates at the juncture of the container and spout, one of said plates being rotatable so as to move its perforations out of register with the perforations of the other plate, means for rotating said rotatable plate, a toothed sector plate immovably secured to said container, and spring controlled means adapted to engage the teeth of said sector plate for locking said last mentioned means in its adjusted positions.

4. In a continuous butter working machine, the combination of a closed trough provided with rotatable worm screws and having an introducing opening at one end, an ingredient holding receptacle arranged to discharge into said opening, stirring means rotatable in the receptacle, means whereby said stirrer means may be placed into operative relation with the driving mechanism for the worm-screws, a pair of perforated plates at the discharge end of the receptacle, one of said plates being rotatable, a toothed sector plate immovably secured to said receptacle, means for rotating the rotatable plate, and spring controlled means adapted to engage with the teeth of said sector plate for locking said plate rotating means in its adjusted positions.

5. In a continuous butter working machine, a closed trough having an introducing opening at one end, worm-screws disposed lengthwise of the trough, the walls of the trough at an intermediate point having water-outlets, slide plates for closing said outlets, reciprocating means for controlling said slideplates, and means operable with the slideplates for moving the butter mass away from the outlets when said slide-plates move to open position.

6. In a continuous butter working machine, the combination of a closed elongated chamber having a butter feeding opening at one end with a worm screw disposed lengthwise in the chamber, with means for rotating the worm screw, water outlets in the opposite side walls of the chamber, a slide plate for each of said outlets, reciprocating means for controlling the slide plates, and rocker means actuated by said worm screw rotating means for actuating said reciprocating means whereby the slide plates on opposite side walls are alternately moved to open and closed position.

7. In a continuous butter working machine of the character described, the combination of a pair of longitudinal channels each provided with a worm screw rotatable therein, a butter introducing hopper at one end of said channels, driving mechanism for said worm screws; the outer side walls of said channels being each provided with a moisture outlet opening; a plate slidably mounted adjacent to each opening in the side walls of said channels, each plate on its inner face being formed to move the butter mass traveling along the channel away from the opening when the plate moves to open position; and means intermediate of each plate and said driving mechanism whereby the plate of one opening is moved to open position while the plate of the other opening is moved to closed position.

CHARLES DOERING.
HENRY H. DOERING.